(12) United States Patent
Kuiper et al.

(10) Patent No.: US 12,151,439 B2
(45) Date of Patent: Nov. 26, 2024

(54) EXTRUSION-BASED ADDITIVE MANUFACTURING: METHOD, 3D PRINTING SYSTEM, AND 3D PRINTED OBJECT

(71) Applicant: DEMCON BOND 3D B.V., Enschede (NL)

(72) Inventors: Guus Kuiper, Enschede (NL); Tom Wimmenhove, Enschede (NL); Bahri Sinan Inanç, Enschede (NL)

(73) Assignee: DEMCON BOND 3D B.V., Enschede (NL)

( * ) Notice: Subject to any disclaimer, the term of this patent is extended or adjusted under 35 U.S.C. 154(b) by 272 days.

(21) Appl. No.: 17/778,563

(22) PCT Filed: Nov. 20, 2020

(86) PCT No.: PCT/EP2020/082869
§ 371 (c)(1),
(2) Date: May 20, 2022

(87) PCT Pub. No.: WO2021/099560
PCT Pub. Date: May 27, 2021

(65) Prior Publication Data
US 2023/0001644 A1   Jan. 5, 2023

(30) Foreign Application Priority Data

Nov. 22, 2019   (EP) ..................... 19210999

(51) Int. Cl.
*B29C 64/386*   (2017.01)
*B29C 64/106*   (2017.01)
(Continued)

(52) U.S. Cl.
CPC .......... *B29C 64/386* (2017.08); *B29C 64/106* (2017.08); *B33Y 10/00* (2014.12); *B33Y 30/00* (2014.12); *B33Y 50/00* (2014.12)

(58) Field of Classification Search
CPC ..... B29C 64/386; B29C 64/106; B33Y 10/00; B33Y 30/00; B33Y 50/00
See application file for complete search history.

(56) References Cited

U.S. PATENT DOCUMENTS

| 5,209,878 A | 5/1993 | Smalley et al. |
| 2016/0096320 A1 | 4/2016 | Bourgoyne |

(Continued)

FOREIGN PATENT DOCUMENTS

CN   106915076 A   7/2017

*Primary Examiner* — Michael W Cho
(74) *Attorney, Agent, or Firm* — Hudak, Shunk & Farine Co. LPA

(57) ABSTRACT

A method for reducing an additional printing time of a 3D object related to printing of an outer wall of the 3D object, the outer wall having an outer surface with an enhanced smoothness. The outer wall is arranged to envelope an inner part of the 3D object. The outer wall includes at least one region having a first outer wall part and a second outer wall part. The first outer wall part forms the outer surface with the enhanced smoothness. The second outer wall part is arranged between the first outer wall part and the inner part and provides a low-resolution part of the outer wall having a less smooth outer surface than the first outer wall part. Hence, the additional printing time related to printing the outer wall having an outer surface with an enhanced smoothness can be reduced. A 3D printing system adapted to perform the method and to a 3D printed object having the abovementioned outer wall.

20 Claims, 6 Drawing Sheets

(51) Int. Cl.
   *B33Y 10/00* (2015.01)
   *B33Y 30/00* (2015.01)
   *B33Y 50/00* (2015.01)

(56) References Cited

U.S. PATENT DOCUMENTS

2016/0346999 A1   12/2016  Patrov
2017/0151714 A1    6/2017  McGee
2018/0290399 A1* 10/2018  Lu ........................ B29C 64/118

* cited by examiner

EXTRUSION-BASED ADDITIVE MANUFACTURING: METHOD, 3D PRINTING SYSTEM, AND 3D PRINTED OBJECT

FIELD OF THE INVENTION

The present invention relates to a method for reducing an additional printing time of a 3D object related to printing of an outer wall of the 3D object, the outer wall having an outer surface with an enhanced smoothness, the 3D object being fabricated using an extrusion-based additive manufacturing process by stacking main layers and sublayers comprising tracks of extruded feedstock material.

The present invention further relates to a 3D printing system for fabricating a 3D object using an extrusion-based additive manufacturing process. The system comprising a processing unit that is configured to perform the method according to the present invention.

The present invention also relates to a 3D printed object that is fabricated using an extrusion-based additive manufacturing process.

BACKGROUND OF THE INVENTION

In 3D printing using an extrusion-based additive manufacturing process, 3D objects are formed by layering extruded feedstock material in a controlled manner such that a desired 3D object can be created. Commonly a 3D printing system is used that comprises a printhead that is moveable in a 3D space with respect to a build plate while dispensing feedstock material on at least one of the build plate and on previously deposited tracks of the feedstock material that are supported by the build plate. However, various options are available for moving the printhead and the build plate on which the 3D object is printed relative to each other.

The 3D printing system comprises a control system that is configured to control a controllable positioning system to which the printhead is attached for controlling movements of the printhead. By means of software a pattern of toolpaths can be generated, which pattern is used for moving the printhead and for depositing the tracks of extruded feedstock material.

The 3D object is created on a build plate in a reference location relative to the movable printhead. The feedstock material can be fused with previously deposited tracks. The modeling material can be fed in the printhead in the form of for example filament, granulate, rod, liquid, resin or a suspension.

The feedstock material is dispensed from the printhead through a feedstock liquefying unit and is deposited on the build plate in the form of tracks forming a layer of tracks, or when a previous layer of the 3D object to be created has been deposited, on previously deposited tracks where it is allowed to solidify. The feedstock material can be thermally or chemically or otherwise fused with the previously deposited tracks. The modeling material can be dispensed from the printhead and deposited on the previously deposited tracks and cured to solidify after the deposition.

The relative motion of the build plate and the 3D object supported by it with respect to the printhead along tracks and simultaneous deposition of feedstock material from the printhead allow the 3D object to be built up and to gradually attain its desired shape with each consecutively deposited track of feedstock material.

Depending on the application of the 3D printed object obtained by extrusion-based additive manufacturing, smoothness of especially an outer surface of the 3D printed object is an important property. A desired smoothness of an outer surface of the 3D printed object can be achieved by choosing an appropriate thickness as seen in a direction perpendicular to the build plate for the tracks of feedstock material constituting the outer surface. The person skilled in the art will appreciate that by reducing the thickness for the tracks of feedstock material the smoothness of the outer surface of parts of the 3D printed object having a non-zero angle with respect to the build plate can be improved.

However, this comes at the expense of an increased printing time of the 3D printed objects. As a result of the increased printing time, the 3D printing system used has a lower throughput. Consequently, the costs of the 3D printed objects increase.

US 2017/0151714 A1 discloses a 3D printing apparatus, wherein the apparatus is configured to use a build material to form a peripheral wall in a plurality of layers, the combined plurality of layers having a first height, and to form an infill section within the peripheral wall, wherein said infill section is formed comprising a single layer and having a second height equal to the first height of the peripheral wall.

CN 106 915 076 A discloses a layering thickness design method suitable for fused deposition modeling. The method specifically comprises the following steps of 1) setting design parameters; 2) determining a height range of each plane; 3) determining a length value lj and a minimal inclination angle thetaj of a height interval; 4) solving a layering thickness hj in a j-th height interval; 5) solving a layering range of the j-th height interval; 6) solving a minimal week number zmin.j of the j-th height interval; 7) solving a layering thickness calculation interval coefficient kj of the j-th height interval; 8) modifying the minimal week number zmin.j and the interval coefficient kj of the j-th height interval; 9) solving a layer number Y of which the inner ring is to be filled, a filling week number Z and a layer week number Z' of which the inner ring is unnecessarily filled in the j-th height interval. The method disclosed by the invention has the advantages that the printing time can be relatively reduced, and the modeling efficiency is improved.

Based on the above, there is a need to provide a method that allows providing a 3D object with an outer wall that has an outer surface with an enhanced smoothness, and wherein the additional printing time related to printing of said outer wall can be reduced. Preferably, the additional printing time related to printing said outer wall can be limited as much as possible.

SUMMARY OF THE INVENTION

It is an object of the present invention to provide a method for reducing an additional printing time of a 3D object related to printing of an outer wall of the 3D object, the outer wall having an outer surface with an enhanced smoothness, said method pre-empting or at least reducing at least one of the abovementioned and/or other disadvantages associated with methods known in the art that are used for printing a 3D object comprising an outer wall that has an outer surface with an enhanced smoothness.

It is another object of the present invention to provide a 3D printing system comprising a processing unit that is configured to perform the method according to the present invention.

It is also an object of the present invention to provide a 3D printed object having an outer surface with an enhanced smoothness, the 3D printed object being fabricated using an extrusion-based added manufacturing process of which the additional printing time that is related to printing of the outer surface with the enhanced smoothness can be reduced using the method according to the present invention.

Aspects of the present invention are set out in the accompanying independent and dependent claims. Features from the dependent claims may be combined with features from the independent claim as appropriate and not merely as explicitly set out in the claims. Furthermore, all features may be replaced with other technically equivalent features.

At least one of the abovementioned objects is achieved by providing a method for reducing an additional printing time of a 3D object related to printing of an outer wall of the 3D object, the outer wall having an outer surface with an enhanced smoothness, the 3D object being fabricated using an extrusion-based additive manufacturing process by stacking main layers and sublayers comprising tracks of extruded feedstock material, the 3D object comprising an inner part, the outer wall being arranged to envelope the inner part, the method comprising:
  obtaining a 3D model of the 3D object;
  determining a number of slices by slicing the 3D model using a predetermined slice height;
  for at least one slice of the number of slices:
    determining an outer boundary of the 3D model;
    determining whether or not an internal boundary is definable in the outer wall to divide the outer wall in a first outer wall part and a second outer wall part, wherein the first outer wall part is arranged to extend between the outer boundary and the internal boundary and configured to be provided with a stack of sublayers that has a total height that is equal to the predetermined slice height to form the outer surface with the enhanced smoothness, and the second outer wall part is arranged to extend between the internal boundary and the inner part and configured to be provided with a main layer that has a predetermined main layer height that is equal to the predetermined slice height, wherein
      in response to determining that the predetermined slice height of a respective slice of the number of slices is at least as high as the predetermined main layer height, thereby establishing that the internal boundary in the outer wall is definable:
        positioning the internal boundary at a distance from the outer boundary at which a minimal number of tracks of a first type of tracks of extruded feedstock material for at least one sublayer of the stack of sublayers equals one,
        filling said at least one sublayer in the first outer wall part with said one track of the first type of tracks having a predetermined first track height that is equal to a predetermined sublayer height, which is a fraction of the predetermined slice height, and a track width having a minimum value that is equal to 50% of a nominal track width of tracks of the first type of tracks and a maximum value that is equal to 200% of the nominal track width of tracks of the first type of tracks (6), and
        filling the second outer wall part with the main layer; or
      in response to determining that the predetermined slice height of a respective slice of the number of slices is smaller than the predetermined main layer height, thereby establishing that the internal boundary in the outer wall is not definable:
        filling the outer wall of the respective slice with a plurality of sublayers, wherein each sublayer of the plurality of sublayers has a predetermined sublayer height that is a fraction of the predetermined slice height.

The person skilled in the art will appreciate that the gist of the method according to the present invention is to at least partially divide the outer wall of the 3D object in a first outer wall part and a second outer wall part. In order to be able to divide the outer wall in said first outer wall part and said second outer wall part, for each slice of the number of slices it is determined whether or not an internal boundary can be defined in the outer wall. An internal boundary can be defined in a respective slice of the number of slices if the predetermined slice height allows accommodation of a main layer, i.e. if the predetermined slice height is at least as high as the predetermined main layer height. In practice, the predetermined main layer height is chosen to be equal to the predetermined slice height of the slices of the number of slices that have been determined based on the 3D model of the 3D object. The person skilled in the art will appreciate that a respective internal boundary of a respective slice of the number of slices can be oriented at any suitable non-zero angle with respect to the respective slice of the number of slices as seen in a direction parallel to the respective slice. Therefore, it will be clear that the internal boundaries of different slices of the number of slices can have different orientations.

If the internal boundary can be defined in a respective slice of the number of slices, the outer wall can be divided into said first outer wall part and said second outer wall part. The first outer wall part of said respective slice can be filled with a complete stack of sublayers, i.e. a stack of sublayers having a total height that can be equal to the predetermined slice height. Each sublayer of the stack of sublayers in the first outer wall part has a predetermined sublayer height that is a fraction of the predetermined slice height. The second outer wall part of said respective slice can be filled with a main layer having a predetermined main layer height that is equal to the predetermined slice height of said respective slice. In this way, the outer wall of the 3D object can at least partially be provided with a second outer wall part that has a lower smoothness and therefore a higher surface roughness than the enhanced smoothness of the outer surface of the 3D object. Preferably, an internal boundary can be defined in all slices of the number of slices in order to divide the outer wall of each slice into said first outer wall part and said second outer wall part. The person skilled in the art will appreciate that by dividing the outer wall of at least one slice of the number of slices into said first outer wall part and said second outer wall part, it is not necessary to print the entire outer wall of the 3D object with the same enhanced smoothness of the outer surface of the 3D object. Hence, the printing time of the 3D object can be reduced.

If a slice of the number of slices has a slice height that is smaller than the predetermined main layer height, i.e. the respective slice cannot accommodate a main layer, the internal boundary cannot be defined in said respective slice. Instead, the respective slice can be filled with a plurality of sublayers, wherein each sublayer of the plurality of sublayers has a predetermined sublayer height that is a fraction of the predetermined slice height. The person skilled in the art will appreciate that each sublayer of the plurality of sublayers and each sublayer of the stack of sublayers in the first outer wall part usually have a predetermined sublayer height that is a same fraction of the predetermined slice height. In this way, the enhanced smoothness of the outer surface of the 3D object as a whole can still be achieved.

The person skilled in the art will appreciate that instead of being used to enable reducing an additional printing time of a 3D object related to printing of an outer surface having an enhanced smoothness, the method according to the present invention can also be used to reduce the total printing time of a 3D object that has an outer surface with a predetermined smoothness that already meets the requirements of a particular application. The latter is enabled by providing at least one slice of the number of slices that can be determined for the 3D model of the 3D object with a first outer wall part and a second outer wall part, wherein the first outer wall part has an enhanced smoothness compared to the second outer wall part. Hence, the method according to the present invention can reduce an additional printing time of a 3D object related to printing of an outer surface of the 3D object, wherein the outer surface has an enhanced smoothness. Alternatively, the method according to the present invention can reduce the printing time of the 3D object if the outer surface already has an appropriate smoothness.

The person skilled in the art will appreciate that it is also possible that each sublayer of the plurality of sublayers has a predetermined sublayer height that is a first fraction of the predetermined slice height and that each sublayer of the stack of sublayers in the first outer wall part has a predetermined sublayer height that is a second fraction of the predetermined slice height, wherein the first fraction and the second fraction are not the same. In that case, a difference in enhanced smoothness of parts of the outer surface of the 3D object could be achieved.

In the context of the present invention a fraction is to be construed as a part of the total. Hence, it will be clear to the person skilled in the art that a predetermined sublayer height that is a fraction of the predetermined slice height is to be construed as a height that is smaller, preferably considerably smaller than the predetermined slice height.

Furthermore, the person skilled in the art will appreciate that in the context of the present invention, an outer surface of the 3D object is to be construed as any surface that has a boundary with an environment outside of the 3D object. If for example the 3D object is a tube, a surface of a wall of the tube surrounding an internal passage through the tube is to be construed as an outer surface of the tube. The same holds of course for a surface of the wall of the tube that faces away from the internal passage through the tube. The latter surface is naturally regarded as an outer surface.

Based on the above, an example of the method according to the present invention is a method for reducing an additional printing time of a 3D object related to printing of an outer wall of the 3D object, the outer wall having an outer surface with an enhanced smoothness, the 3D object being fabricated using an extrusion-based additive manufacturing process by stacking main layers and sublayers comprising tracks of extruded feedstock material, the 3D object comprising an inner part, the outer wall being arranged to envelope the inner part, the method comprising:
    obtaining a 3D model of the 3D object;
    determining a number of slices by slicing the 3D model using a predetermined slice height;
    for each slice of the number of slices:
        determining an outer boundary of the 3D model;
        determining whether or not an internal boundary is definable in the outer wall to divide the outer wall in a first outer wall part and a second outer wall part, wherein the first outer wall part is arranged to extend between the outer boundary and the internal boundary and configured to form the outer surface of the 3D object with the enhanced smoothness, and the second outer wall part is arranged to extend between the internal boundary and the inner part, wherein
        in response to determining that for a respective slice of the number of slices the internal boundary in the outer wall is definable, filling the first outer wall part with a stack of sublayers that has a total height that is equal to the predetermined slice height, and filling the second outer wall part with a main layer that has a predetermined main layer height that is equal to the predetermined slice height, wherein each sublayer of the stack of sublayers has a predetermined sublayer height that is a fraction of the predetermined slice height; or
        in response to determining that for a respective slice of the number of slices the internal boundary in the outer wall is not definable, filling the outer wall of the respective slice with a plurality of sublayers, wherein each sublayer of the plurality of sublayers has a predetermined sublayer height that is a fraction of the predetermined slice height.

In an embodiment of the method according to the invention, provided that the internal boundary in the outer wall is definable, filling of a respective sublayer of the stack of sublayers is omitted if for the respective sublayer the distance from the outer boundary to the internal boundary is smaller than the minimum value of the track width of a track of the first type of tracks. In this way the respective sublayer cannot be filled with a track of the first type of tracks of extruded feedstock material.

In an example of the method according to the invention, filling the first outer wall part with a stack of sublayers that has a total height that is equal to the predetermined slice height comprises providing at least one sublayer of the stack of sublayers with a minimal number of tracks of a first type of tracks of extruded feedstock material, wherein said tracks of the first type of tracks have a predetermined first track height that is equal to the predetermined sublayer height.

In this way, a distance from the outer boundary to the internal boundary through the first outer wall part of at least one slice of the number of slices as seen in a direction parallel to the slice can be reduced. Hence, the internal boundary of said at least one slice can be arranged at a preferred distance from the outer boundary of the 3D model. The person skilled in the art will appreciate that preferably each sublayer of the stack of sublayers is provided with a minimal number of tracks of a first type of tracks of extruded feedstock material. As a result, the respective lengths of the respective first outer wall parts of all slices of the number of slices can be reduced. The person skilled in the art will appreciate that if the respective internal boundaries of the respective slices of the number of slices are at their respective preferred distances from the respective outer boundaries of the respective slices, the respective distances from the outer boundary to the internal boundary through the respective high-resolution first outer wall parts that should achieve the predetermined smoothness of the outer surface of the 3D object can be reduced. Therefore, by positioning the respective internal boundaries in the respective slices of the number of slices at their respective preferred distances with respect to the respective outer boundaries of the respective slices, the additional printing time related to printing of the outer wall of the 3D object with the enhanced smoothness, i.e. enhanced resolution or reduced roughness, can be reduced.

In an embodiment of the method according to the invention, provided that the internal boundary in the outer wall is definable, a respective sublayer of the stack of sublayers is filled with at least two tracks of the first type of tracks if for the respective sublayer the distance from the outer boundary to the internal boundary is larger than the maximum value of the track width of a track of the first type of tracks, wherein a total width of the at least two tracks is equal to said distance. The person skilled in the art will appreciate that each of the at least two tracks of the first type of tracks has a respective track width that ranges from the minimum value of the track width of a track of the first type of tracks to the maximum value of the track width of a track of the first type of tracks.

In an example of the method according to the invention, filling the first outer wall part with a stack of sublayers that has a total height that is equal to the predetermined slice height further comprises positioning the internal boundary at a distance from the outer boundary at which the minimal number of tracks of the first type of tracks of extruded feedstock material for at least one sublayer of the stack of sublayers equals one, wherein each track of the first type of tracks has a track width in a range that has a lower boundary that is defined as a minimum percentage of a nominal track width of the track of the first type of tracks, and an upper boundary that is defined as a maximum percentage of the nominal track width of the track of the first type of tracks.

The person skilled in the art will appreciate that in this way a distance from the outer boundary to the internal boundary through the first outer wall part of at least one slice of the number of slices as seen in a direction parallel to the slice can be kept as small as possible. Hence, the internal boundary of said at least one slice can be arranged at an optimal distance from the outer boundary of the 3D model. The person skilled in the art will appreciate that preferably each sublayer of the stack of sublayers is provided with one track of a first type of tracks of extruded feedstock material. As a result, the respective distances from the outer boundary to the internal boundary through the respective first outer wall parts of all slices of the number of slices can be kept as small as possible. The person skilled in the art will appreciate that the respective internal boundaries of the respective slices of the number of slices are at their optimal distances because the respective enhanced resolution first outer wall parts that should achieve the enhanced smoothness of the outer surface of the 3D object are configured to be as small as possible. Therefore, by positioning the respective internal boundaries in the respective slices of the number of slices at their respective optimal distances with respect to the respective outer boundaries of the respective slices, the additional printing time related to printing of the outer wall of the 3D object with the enhanced smoothness, i.e. enhanced resolution or reduced roughness, can be reduced as much as possible.

The person skilled in the art will appreciate that depending on the shape of the outer boundary of a respective slice the distance between the outer boundary and the internal boundary can be different for the individual tracks of the first type of tracks of extruded feedstock material in the first outer wall part. Filling each sublayer of the stack of sublayers between the outer boundary and the internal boundary with one track of the first type of tracks is possible as long as the required track width stays within the abovementioned range that has a lower boundary that is defined as a minimum percentage of a nominal track width of the track of the first type of tracks, and an upper boundary that is defined as a maximum percentage of the nominal track width of the track of the first type of tracks. The person skilled in the art will appreciate that the number of tracks of the first type can vary at different locations along the circumference of the first outer wall part.

If an internal boundary in a respective slice of the number of slices would be positioned at a distance closer to the outer boundary than the aforementioned optimal distance for the internal boundary, at least one sublayer of the stack of sublayers could not be provided with one track of a first type of tracks of extruded feedstock material as such track would have to be printed with a track width as seen in a direction parallel to the slice that is smaller than a track width that is equal to a minimum percentage of a nominal track width of the track of the first type of tracks that can be achieved. In the case that at least one sublayer of the stack of sublayers could not be provided with one track of a first type of tracks of extruded feedstock material, the outer surface of the 3D object cannot have the predetermined smoothness because sublayers of the aforementioned type could not be provided with a track of a first type of tracks of extruded feedstock material. Such absence of extruded feedstock material would render the outer surface of the 3D object to have a less enhanced smoothness than desired.

In addition, if an internal boundary in a respective slice of the number of slices would be positioned at a distance farther away from the outer boundary than the aforementioned optimal distance for the internal boundary, the sublayers of the stack of sublayers provided in the first outer wall part would be provided with more than one track of a first type of tracks of extruded feedstock material as the track width of such tracks as seen in a direction parallel to the slice would exceed a track width that is equal to a maximum percentage of a nominal track width of the track of the first type of tracks that can be achieved. The person skilled in the art will appreciate that in the case that the sublayers of the stack of sublayers provided in the first outer wall part would be provided with more than one track of a first type of tracks of extruded feedstock material, it would be possible to achieve the enhanced smoothness of the outer surface of the 3D object. However, the additional printing time related to printing of the first outer wall part with the enhanced smoothness, i.e. enhanced resolution or reduced roughness, would be sub-optimal as more high-resolution tracks in the first outer wall part than at least one of desired and necessary would have to be printed. As a result, the costs involved with printing the 3D object would be higher than at least one of desired and necessary.

In an embodiment of the method according to the invention, provided that the internal boundary in the outer wall is definable, the distance from the outer boundary to the internal boundary has a minimum value that is equal to 50% of the nominal track width of tracks of the first type of tracks and a maximum value that is equal to 200% of the nominal track width of tracks of the first type of tracks, thereby allowing each sublayer of the stack of sublayers to be filled with one track of the first type of tracks. In this way, the distance from the outer boundary to the internal boundary through the first outer wall part as seen in a direction parallel to each sublayer can be kept as small as possible. Consequently, the additional printing time for the first outer wall part can be reduced as much as possible while enhancing the surface smoothness of the first outer wall part.

In an example of the method according to the invention, the minimum percentage of the nominal track width of the track of the first type of tracks is 50%, and the maximum percentage of the nominal track width of the track of the first type of tracks is 200%.

The person skilled in the art will appreciate that the minimum percentage of the nominal track width of the track of the first type of tracks that can be achieved depends among others on the extrusion-based additive manufacturing process used, the geometry of the nozzle of the printhead used and on the type of feedstock material used. The same holds for the maximum percentage of the nominal track width of the track of the first type of tracks that can be achieved.

In an embodiment of the method according to the invention, filling the outer wall of the respective slice with a plurality of sublayers further comprises:

filling at least one sublayer of the plurality of sublayers with a minimal number of tracks of the first type of tracks of extruded feedstock material, wherein the minimal number of said tracks is one of:

equal to zero if the outer wall of said at least one sublayer has a width that is smaller than said minimum value of the track width of a track of the first type of tracks, thereby preventing said at least one sublayer to be filled;

equal to one if the width of the outer wall of said at least one sublayer has a value ranging from said minimum value to said maximum value of the track width of a track of the first type of tracks; and equal to at least two if the width of the outer wall has a value that is larger than said maximum value of the track width of a track of the first type of tracks, wherein said at least two tracks have a total width that is equal to the width of the outer wall.

As discussed above, if a slice of the number of slices has a slice height that is smaller than the predetermined main layer height, i.e. the respective slice cannot accommodate a main layer, the internal boundary cannot be defined in said respective slice. Instead of dividing the outer wall in said first outer wall part and said second outer wall part, the respective slice can be filled with a plurality of sublayers. Each sublayer of the plurality of sublayers has a predetermined sublayer height that is a fraction of the predetermined slice height. The person skilled in the art will appreciate that the predetermined main layer height can be different for individual layers. The same considerations apply for the individual layers having their respective predetermined main layer heights.

The person skilled in the art will appreciate that by filling at least one sublayer of the plurality of sublayers with a minimal number of tracks of the first type of tracks of extruded feedstock material, the printing time of the respective sublayer can be reduced. As a result, the additional printing time related to printing the outer surface with the enhanced smoothness can be reduced.

The person skilled in the art will appreciate that preferably each sublayer of the plurality of sublayers is filled with a minimal number of tracks of the first type of tracks of extruded feedstock material as it allows further reduction of the additional printing time related to printing the outer surface with the enhanced smoothness.

In an example of the method according to the invention, filling the outer wall of the respective slice with a plurality of sublayers further comprises filling at least one sublayer of the plurality of sublayers with a minimal number of tracks of the first type of tracks of extruded feedstock material.

In an embodiment of the method according to the invention, filling the second outer wall part with a main layer that has a predetermined main layer height that is equal to the predetermined slice height comprises providing a track of a second type of tracks of extruded feedstock material, wherein the track of the second type of tracks has a predetermined second track height that is equal to the predetermined main layer height. As mentioned above, the person skilled in the art will appreciate that the predetermined main layer height can be different for individual layers.

Moreover, the person skilled in the art will appreciate that in this way it is not necessary to print the entire outer wall of the 3D object with the same enhanced smoothness of the outer surface of the 3D object. Hence, the additional printing time related to printing the outer surface with the enhanced smoothness can be reduced.

In an embodiment of the method according to the invention, the inner part is provided with an infill structure that comprises a mesh of main layers, the main layers of said mesh comprising tracks of the second type of tracks of extruded feedstock material.

The person skilled in the art will appreciate that in this way the printing time of the inner part can be reduced. This allows the total printing time of a 3D object having an outer surface with an enhanced smoothness to be reduced.

In an embodiment of the method according to the invention, the predetermined slice height is dependent on a desired printing time of the 3D object.

The person skilled in the art will appreciate that in the case of a higher predetermined slice height the printing time of the 3D object will be reduced as less printhead movements would be required. Obviously, in the case of a lower predetermined slice height the printing time of the 3D object will be increased as more printhead movements would be required.

In an embodiment of the method according to the invention, the predetermined slice height is dependent on a desired enhancement of the smoothness of the outer surface of the 3D object.

The person skilled in the art will appreciate that in the case that a higher enhancement of the smoothness of the outer surface of the 3D object is desired, i.e. the outer surface of the 3D object has a higher resolution and therefore a lower roughness, a lower predetermined slice height is required. As a result, the printing time of the 3D object will be increased as more printhead movements would be required. Obviously, in the case that a lower enhancement of the smoothness of the outer surface of the 3D object is desired, i.e. the outer surface of the 3D object has a lower resolution and therefore a higher roughness, a higher predetermined slice height can be used. As a result, the printing time of the 3D object will be reduced as less printhead movements would be required.

In an embodiment of the method according to the invention, the stack of sublayers of the first outer wall part is arranged to be in contact at the internal boundary with a main layer of the second outer wall part.

The person skilled in the art will appreciate that in this way the stability and integrity of the outer wall as a whole can be ensured.

In an embodiment of the method according to the invention, said contact at the internal boundary is free of voids.

It is to be noted that in the context of the present invention a contact at the internal boundary that is free of voids is to be construed as a contact between tracks of the first type of tracks of extruded feedstock material and tracks of the second type of tracks of extruded feedstock material, wherein said contact does not include any voids. The person skilled in the art will appreciate that such a contact at the internal boundary can improve the stability and integrity of the outer wall as a whole.

According to another aspect of the present invention, a 3D printing system for fabricating a 3D object using an extrusion-based additive manufacturing process is provided, the system comprising a processing unit that is adapted to perform a method according to the present invention.

The person skilled in the art will appreciate that the processing unit of the 3D system according to the invention is operatively connected with all relevant parts of the 3D printing system that are required to print a 3D object using an extrusion-based additive manufacturing process. The 3D printing system according to the invention is thus adapted to provide the 3D object with an outer surface that has an enhanced smoothness while allowing the additional printing time related to printing the outer surface with the enhanced smoothness to be reduced.

According to yet another aspect of the present invention, a 3D printed object is provided that is fabricated using the method according to the present invention. In an example, the 3D printed object comprises an outer wall that has an outer surface with an enhanced smoothness. The 3D printed object is fabricated using an extrusion-based added manufacturing process. The 3D printed object comprises an inner part, the outer wall being arranged to envelope the inner part, the outer wall comprising at least one region in which the outer wall comprises a first outer wall part and a second outer wall part, wherein in said at least one region of the outer wall:

the first outer wall part is configured to form the outer surface of the 3D printed object with the enhanced smoothness;

the first outer wall part comprises at least one track of a first type of tracks of extruded feedstock material, said at least one track of the first type of tracks having a predetermined first track height;

the second outer wall part is arranged between the first outer wall part and the inner part;

the second outer wall part comprises at least one track of a second type of tracks of extruded feedstock material, said at least one track of the second type of tracks having a predetermined second track height; and the predetermined first track height of the at least one track of the first type of tracks is a fraction of the predetermined second track height of the at least one track of the second type of tracks.

The person skilled in the art will appreciate that by providing the 3D printed object with an outer wall that comprises at least one region in which the outer wall comprises a first outer wall part and a second outer wall part a 3D printed object can be obtained that is provided with an outer surface having an enhanced smoothness while allowing the additional printing time related to printing the outer surface with the enhanced smoothness to be reduced. The first outer wall part and the second outer wall part can be observed after making an appropriate cross-section through the 3D printed object. In this way it can be determined if the 3D printed object was printed in accordance with the teaching of the present invention.

In an example of the 3D printed object according to the invention, in said at least one region of the outer wall at an internal boundary between the first outer wall part and the second outer wall part the at least one track of the first type of tracks of extruded feedstock material of the first outer wall part and the at least one track of the second type of tracks of extruded feedstock material of the second outer wall part are in a void free contact with each other.

As mentioned above, in the context of the present invention a contact at the internal boundary that is free of voids is to be construed as a contact between the at least one track of the first type of tracks of extruded feedstock material and the at least one track of the second type of tracks of extruded feedstock material, wherein said contact does not include any voids. The person skilled in the art will appreciate that such a contact at the internal boundary can improve the stability and integrity of the outer wall as a whole.

In an example of the 3D printed object according to the invention, the inner part is provided with an infill structure that comprises a mesh of tracks of the second type of tracks of extruded feedstock material.

The person skilled in the art will appreciate that in this way the printing time of the inner part can be reduced. This allows the total printing time of a 3D object having an outer surface with an enhanced smoothness to be reduced.

BRIEF DESCRIPTION OF THE DRAWINGS

Further features and advantages of the invention will become apparent from the description of the invention by way of exemplary and non-limiting embodiments of a method, a 3D printing system and a 3D printed object according to the invention.

The person skilled in the art will appreciate that the described embodiments of the method, the 3D printing system and the 3D printed object according to the invention are exemplary in nature only and not to be construed as limiting the scope of protection in any way. The person skilled in the art will realize that alternatives and equivalent embodiments of the method, the 3D printing system and the 3D printed object can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

DETAILED DESCRIPTION OF EMBODIMENTS

The invention will be further elucidated in exemplary embodiments thereof as described below.

Figure 1A:
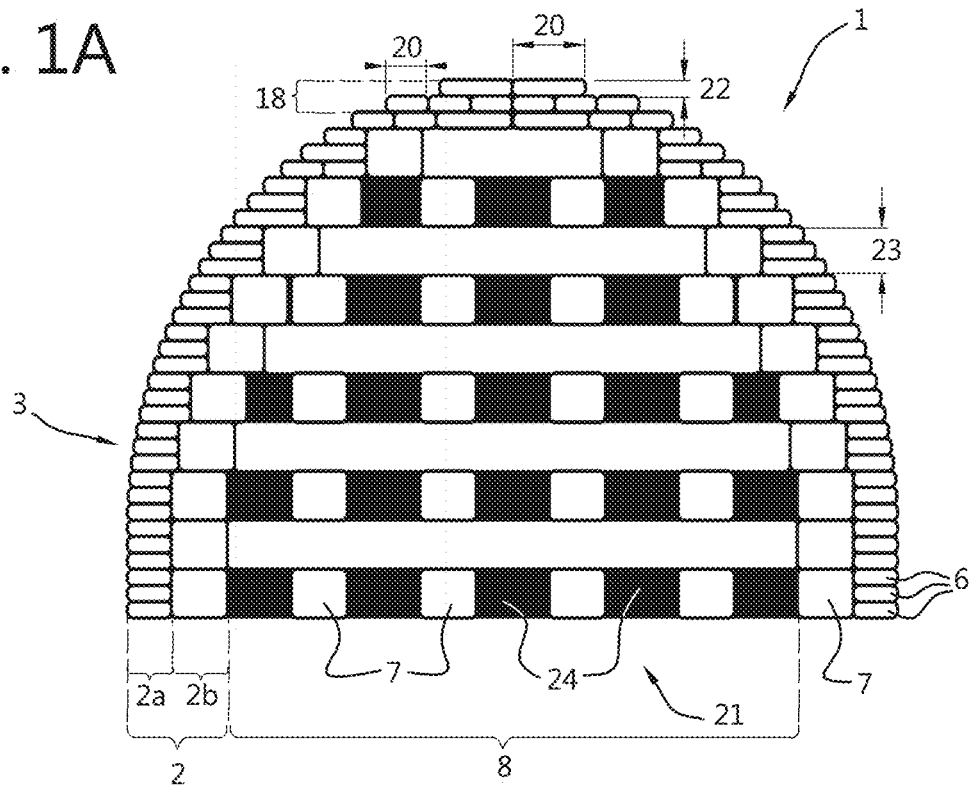
FIG. 1A shows a schematic cross-sectional view of a first exemplary, non-limiting embodiment of a 3D printed object according to the invention, the 3D printed object being obtained by a method according to the present invention in which a first outer wall part of the outer wall of the 3D object is provided with tracks of a first type of tracks having a variable track width.

FIG. 1A shows a schematic cross-sectional view of an exemplary, non-limiting embodiment of a 3D printed object 1 according to the invention. The person skilled in the art will appreciate that the 3D printed object can be any object that can be printed using an extrusion-based additive manufacturing process. FIG. 1A shows that the 3D printed object 1 comprises an outer wall 2 that comprises at least one region in which the outer wall 2 comprises a first outer wall part 2a and a second outer wall part 2b. In this region the first outer wall part 2a forms the outer surface 3 with the enhanced smoothness. As shown in FIG. 1A, the enhanced smoothness of the outer surface 3 is achieved by filling the first outer wall part 2a with tracks of a first type of tracks 6 that have a variable track width 20 and a predetermined first track height 22 that is a fraction of the predetermined second track height 23 of the tracks of a second type of tracks 7 with which the second outer wall part 2b is filled. The person skilled in the art will appreciate that in this way an outer surface with an enhanced smoothness can be achieved by only printing the tracks of the first type of tracks 6 in the first outer wall part 2a. The second outer wall part 2b that is filled with tracks of a second type of tracks 7 having a predetermined second track height 23 provides a low-resolution part of the outer wall having a less smooth outer surface than the first outer wall part. Hence, an additional printing time of the 3D object 1 related to printing of said outer wall 2 can be reduced as compared to the situation in which the entire outer wall 2 would be provided with tracks of the first type of tracks 6.

In the region of the 3D object 1 in which the outer wall 2 does not comprise said first outer wall part 2a and said second outer wall part 2b, the outer wall 2 comprises a plurality of sublayers 18. The sublayers of said plurality of sublayers are provided with tracks of the first type of tracks 6 of extruded feedstock material having the predetermined first track height 22. In this way, the outer surface 3 of the 3D object 1 has the same enhanced smoothness in this region of the outer wall 2 as in the region of the outer wall that comprises said first outer wall part 2a and said second outer wall part 2b.

The person skilled in the art will appreciate that the first outer wall part 2a and the second outer wall part 2b can be observed after making an appropriate cross-section through the 3D printed object 1. In this way it can be determined if the 3D printed object 1 was printed in accordance with the teaching of the present invention.

The second outer wall part 2b is arranged between the first outer wall part 2a and an inner part 8 of the 3D printed object 1. The inner part 8 is provided with an infill structure 21 that comprises a mesh of tracks of the second type of tracks 7 of extruded feedstock material. The person skilled in the art will appreciate that by providing the inner part 8 with said infill structure 21 the printing time of the inner part and therefore the total printing time of the 3D object 1 can be reduced.

Figure 1B:
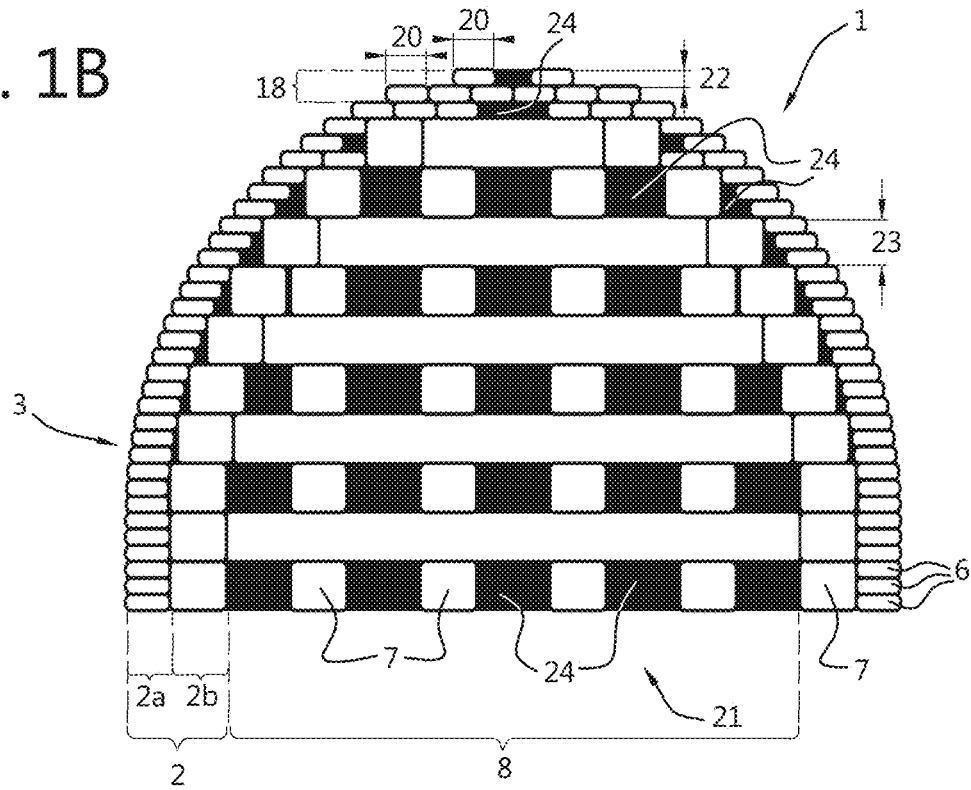
FIG. 1B shows a schematic cross-sectional view of a second exemplary, non-limiting embodiment of a 3D printed object according to the invention, the 3D printed object being obtained by a method according to the present invention in which the first outer wall part of the outer wall of the 3D object is provided with tracks of a first type of tracks having a constant track width.

FIG. 1B shows a schematic cross-sectional view of a second exemplary, non-limiting embodiment of a 3D printed object 1 according to the invention, the 3D printed object 1 being obtained by a method according to the present invention in which the first outerwall part 2a of the outerwall 2 of the 3D object 1 is provided with tracks of the first type of tracks 6 having a constant track width 20. By comparing FIGS. 1A and 1B, the person skilled in the art will appreciate that by using a constant track width 20 instead of a variable track width 20 for the tracks of the first type of tracks 6 in the first outer wall part 2a, voids 24 can be present between the stack of tracks of the first type of tracks 6 of the first outer wall part 2a and the tracks of the second type of tracks 7 of the second outer wall part 2b. Therefore, a variable track width 20 can be used to reduce and ultimately avoid any voids between the stack of tracks of the first type of tracks 6 of the first outer wall part 2a and the tracks of the second type of tracks 7 of the second outer wall part 2b.

Figure 2:
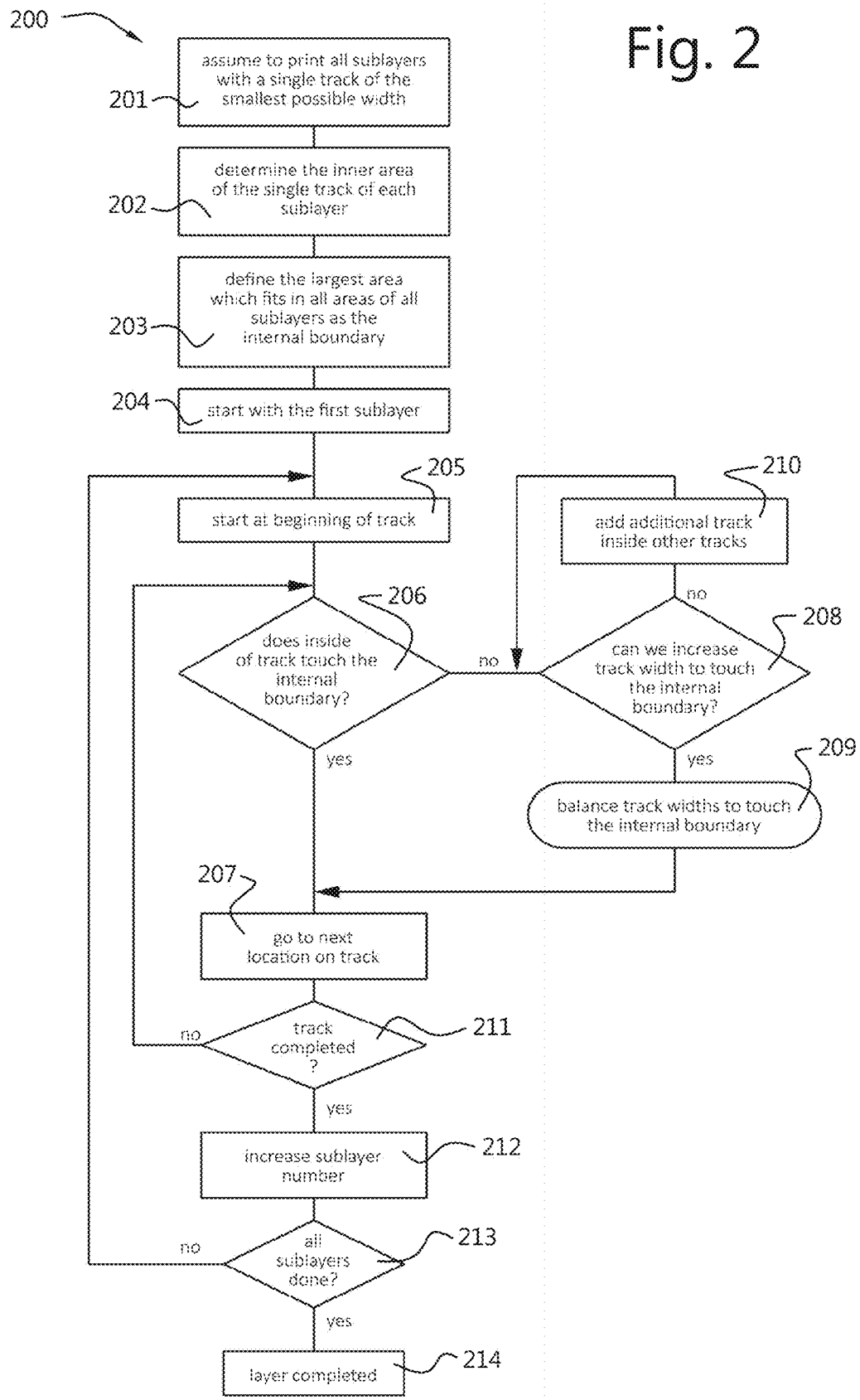
FIG. 2 shows a flow diagram of an exemplary, non-limiting embodiment of determining an internal boundary in a slice of a 3D model of a 3D object to divide the outerwall into a first outerwall part and a second outerwall part and providing each sublayer of the stack of sublayers in the first outer wall part with a minimal number of tracks of the first type of tracks of feedstock material in accordance with the method of the present invention.

FIG. 2 shows a flow diagram 200 of an exemplary, non-limiting embodiment of determining an internal boundary in a slice of a 3D model of a 3D object to divide the outer wall into a first outer wall part and a second outer wall part and providing each sublayer of the stack of sublayers in the first outer wall part with a minimal number of tracks of the first type of tracks of feedstock material in accordance with the method of the present invention.

As a first step 201 in the flow diagram 200 of FIG. 2 it is assumed that all sublayers of the stack of sublayers provided in the first outer wall part are printed with a single track that has a smallest possible track width, i.e. the track width is equal to a minimum percentage of the nominal track width of the track of the first type of tracks of feedstock material. The person skilled in the art will appreciate that the minimum percentage of the nominal track width of the track of the first type of tracks that can be achieved depends among others on the extrusion-based additive manufacturing process used, the geometry of the nozzle of the printhead used and on the type of feedstock material used. The same holds for the maximum percentage of the nominal track width of the track of the first type of tracks that can be achieved. The track width of the single track can be adjusted between the minimum percentage of the nominal track width of the track of the first type of tracks and the maximum percentage of the nominal track width of the track of the first type of tracks. If the required track width is smaller than the minimum percentage of the nominal track width of the track of the first type of tracks, then the track cannot be printed. If the required track width is larger than the maximum track width, then an additional track needs to be printed.

A second step 202 in the flow diagram 200 instructs to determine an inner area of the single track of each sublayer. Then the largest area of the single track of each sublayer is determined. A third step 203 in the flow diagram 200 instructs to define the largest area which fits in all areas of all sublayers as the internal boundary, i.e. the internal boundary that divides the outer wall into said first outer wall part and said second outer wall part. After defining the internal boundary, a fourth step 204 in the flow diagram 200 instructs to start with the first sublayer of the stack of sublayers in the first outer wall part that is to be provided with a minimal number of tracks of the first type of tracks of feedstock material. A fifth step 205 in the flow diagram 200 instructs to start at the beginning of the track. A first decision step 206 in the flow diagram 200 instructs to determine if the inside of the track touches the internal boundary. If this is the case, a sixth step 207 in the flow diagram 200 instructs to go to the next location on the track. If this is not the case, a second decision step 208 instructs to check if the track width can be increased such that the track can touch the internal boundary. If this is possible, a seventh step 209 in the flow diagram 200 instructs to balance, i.e. adjust, the track width to touch the internal boundary. As mentioned above, the track width can be adjusted between the minimum percentage of the nominal track width of the track of the first type of tracks and the maximum percentage of the nominal track width of the track of the first type of tracks. If the width of the track cannot be adjusted such that the track can touch the boundary, i.e. when the required track width to touch the boundary is larger than the maximum track width, then an eight step 210 in the flow diagram 200 instructs to add an additional track inside the other track. The person skilled in the art will appreciate that the number of adjacent tracks in the first outer wall part can vary along the length of the tracks, depending on the slope of the outer surface.

After going to the next location on the track in accordance with the sixth step 207 in the flow diagram 200, a third decision step 211 in the flow diagram 200 instructs to check if the track is completed. If this is not the case, at least steps 206 and 207 of the abovementioned steps 206-210 are repeated until it is determined in the third decision step 211 that the track has been completed. After the track has been completed, a ninth step 212 in the flow diagram 200 instructs to increase the sublayer number. A fourth decision step 213 instructs to check if all sublayers are done. If this is not the case, at least steps 205, 206, 207, 211 and 212 of the abovementioned steps 205-212 are repeated until it is determined in the fourth decision step 213 that all sublayers have been done. If all sublayers have been done, a final step 214 in the flow diagram indicates that the layer has been completed, i.e. all sublayers of the stack of sublayers of the respective slice of the 3D model of the 3D object are provided with a minimal number of tracks of the first type of tracks of feedstock material in accordance with the method of the present invention.

Figure 3A:
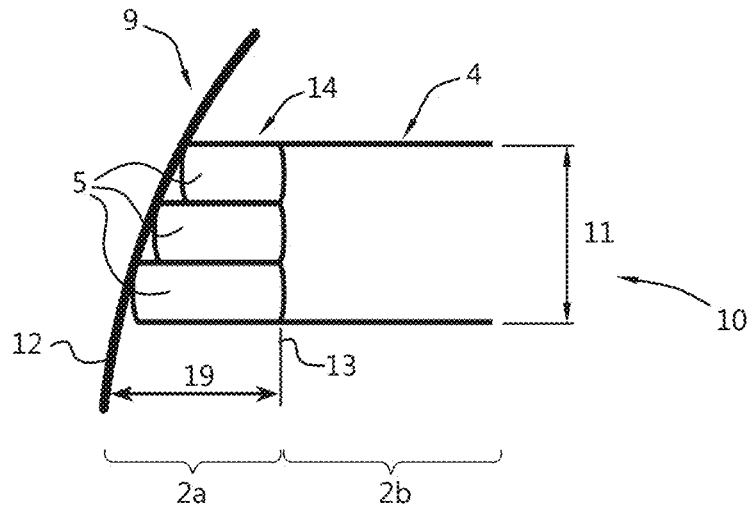
FIGS. 3A, 3B and 3C schematically illustrate how for one slice of the 3D model of the second exemplary, non-limiting embodiment of the 3D object shown in FIG. 1A the optimal distance between the internal boundary and the outer boundary of the 3D model can be determined.
Figure 3B:
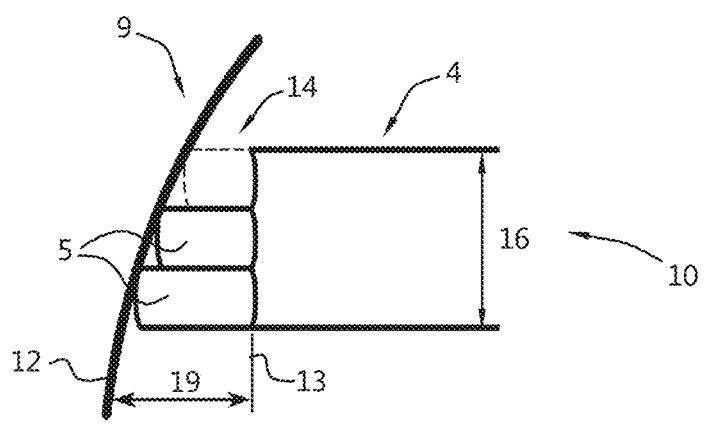
Figure 3C:
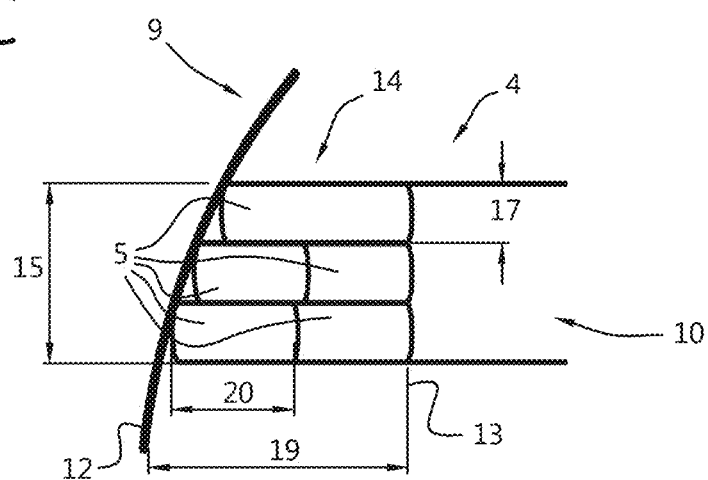

FIGS. 3A, 3B and 3C schematically illustrate how for one slice 10 of the 3D model 9 of the exemplary, non-limiting embodiment of the 3D object 1 shown in FIG. 1A the optimal distance between the internal boundary 13 and the outer boundary 12 of the 3D model 9 can be determined.

The person skilled in the art will appreciate that depending on the shape of the outer boundary 12 of a respective slice 10 the distance 19 between the outer boundary 12 and the internal boundary 13 can be different for the individual sublayers 5 of the stack of sublayers 14 in the first outer wall part 2a. Filling each sublayer 5 of the stack of sublayers 14 between the outer boundary 12 and the internal boundary 13 with a single track of the first type of tracks of feedstock material is possible as long as the required track width stays within the range that has a lower boundary that is defined as a minimum percentage of a nominal track width of the track of the first type of tracks, and an upper boundary that is defined as a maximum percentage of the nominal track width of the track of the first type of tracks.

FIG. 3A shows a distance 19 between the internal boundary 13 and the outer boundary 12 of the 3D model 9 that in the context of the present invention is construed as optimal because the first outer wall part 2a is filled with a stack of sublayers 14 that has a total height 15 that is equal to the predetermined slice height 11 and each sublayer 5 of the stack of sublayers 14 can be provided with a single track of the first type of tracks of extruded feedstock material. The person skilled in the art will appreciate that in this way the distance 19 between the outer boundary 12 and the internal boundary 13 and therefore a length of the first outer wall part 2a as seen in a direction parallel to the slice 10 can be kept as small as possible. The second outer wall part 2b can be provided with a main layer 4 that has a predetermined main layer height 16 that is equal to the predetermined slice height 11. The main layer 4 can be provided with a track of the second type of tracks of feedstock material. As a result of determining the optimal distance between the outer boundary 12 and the internal boundary 13, the additional printing time related to printing of the outer wall of the 3D object with the enhanced smoothness, i.e. enhanced resolution or reduced roughness, can be reduced as much as possible.

FIG. 3B shows that in the case that the internal boundary 13 is positioned at a distance 19 closer to the outer boundary 12 than the optimal distance for the internal boundary 13 as shown in FIG. 3A, one sublayer of the stack of sublayers cannot be arranged in the first outer wall part 2a as it cannot be provided with a single track of a first type of tracks of extruded feedstock material as such track would have to be printed with a track width as seen in a direction parallel to the slice 10 that is smaller than a track width that is equal to a minimum percentage of a nominal track width of the track of the first type of tracks. In the case that the first outer wall part 2a cannot be provided with a complete stack of sublayers 14, i.e. with a stack of sublayers 14 that has a total height 15 that is equal to the predetermined slice height 11, the outer surface of the 3D object cannot have the predetermined smoothness because extruded feedstock material would be missing. Such absence of extruded feedstock material would render the outer surface of the 3D object to have a less enhanced smoothness than desired. Hence, the person skilled in the art will appreciate that the internal boundary 13 should be shifted to the optimal distance shown in FIG. 3A.

FIG. 3C shows that in the case that the internal boundary 13 is positioned at a distance 19 farther way from the outer boundary 12 than the optimal distance for the internal boundary 13 as shown in FIG. 3A, the sublayers 5 of the stack of sublayers 14 that are provided in the first outer wall part 2a would have to be provided with more than one track of a first type of tracks of extruded feedstock material as the track width of such tracks as seen in a direction parallel to the slice 10 would exceed a track width that is equal to a maximum percentage of a nominal track width of the track of the first type of tracks. The person skilled in the art will appreciate that in the case that the sublayers 5 of the stack of sublayers 14 that are provided in the first outer wall part 2a would be provided with more than one track of the first type of tracks of extruded feedstock material, it would be possible to achieve the enhanced smoothness of the outer surface of the 3D object. However, the additional printing time related to printing of the first outer wall part 2a with the enhanced smoothness, i.e. enhanced resolution or reduced roughness, would be too long as more high-resolution tracks in the first outer wall part than at least one of desired and necessary would have to be printed. As a result, the costs involved with printing the 3D object would be higher than at least one of desired and necessary. Hence, the person skilled in the art will appreciate that the internal boundary 13 should be shifted to the optimal distance shown in FIG. 3A.

Based on the above, the person skilled in the art will appreciate that the gist of the method according to the present invention is to find the optimal distance for the internal boundary 13 from the outer boundary 12 to divide the outer wall 2 into a first high-resolution outer wall part 2a and a second low-resolution outer wall part 2b, wherein each of the sublayers 5 of the stack of sublayers 14 in the first high-resolution outer wall part 2a is provided with a minimal number of tracks of the first type of tracks of feedstock material.

As mentioned above, the person skilled in the art will appreciate that a respective internal boundary of a respective slice of the number of slices can be oriented at any suitable non-zero angle with respect to the respective slice of the number of slices as seen in a direction parallel to the respective slice, i.e. as seen in a main direction in which the respective slice extends. Therefore, it will be clear that the internal boundaries of different slices of the number of slices can have different orientations. From FIGS. 3A-3C it can be observed that the internal boundary 13 in the one slice 10 is vertically oriented, i.e. at a non-zero angle of 90° with respect to the slice 10 as seen in a direction parallel to the slice 10. In the specific embodiments shown in FIGS. 3A-3C the direction parallel to the slice 10 is to be construed as a horizontal direction. The non-zero angle between the internal boundary 13 and the horizontal direction in this case is 90°. Furthermore, from FIG. 3A-3C it can be observed that there are no voids present between the stack of sublayers 14 of the first outer wall part 2a and the main layer 4 of the second outer wall part 2b.

Figure 4A:
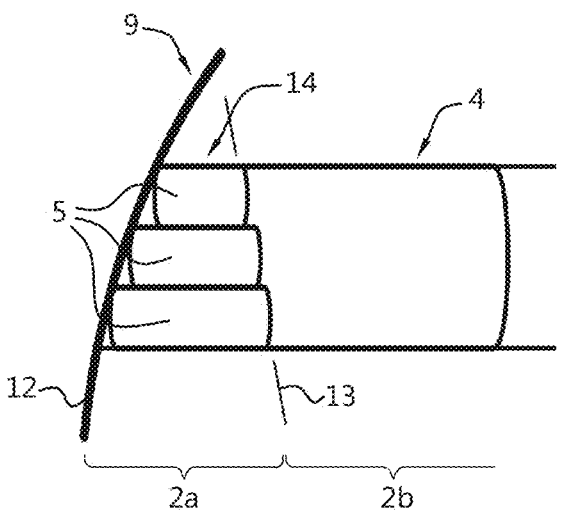
FIGS. 4A and 4B schematically show exemplary and non-limiting embodiments in which the respective internal boundaries in the respective slices are oriented at different non-zero angles with respect to the respective slices as seen in a direction parallel to the respective slices, i.e. as seen in a main direction in which the respective slice extends, and in which there are no voids present between the stack of sublayers of the first outer wall part and the main layer of the second outer wall part.
Figure 4B:
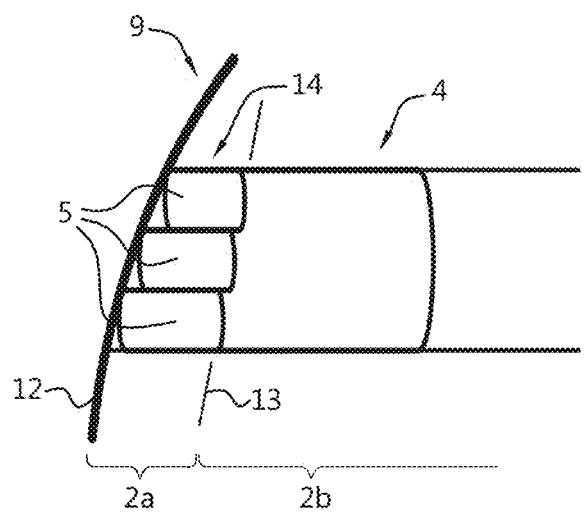
Figure 4C:
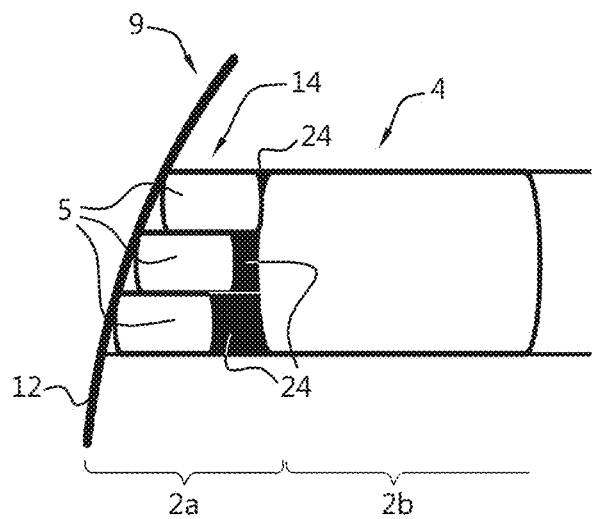
FIG. 4C schematically shows an exemplary and non-limiting embodiment in which the internal boundary has the same orientation as the internal boundary shown in FIG. 4B and in which voids are present between the stack of sublayers of the first outer wall part and the main layer of the second outer wall part.

FIGS. 4A and 4B schematically show exemplary and non-limiting embodiments in which the respective internal boundaries 13 are oriented at different non-zero angles with respect to the respective slices 10 as seen in a direction parallel to the respective slices 10, i.e. as seen in a main direction in which the respective slices 10 extend. In the specific embodiments shown in FIGS. 4A-4C the direction parallel to the respective slices 10 is also to be construed as a horizontal direction. The internal boundary 13 in the slice 10 as shown in FIG. 4A is slanted towards the outer boundary 12, whereas the internal boundary 13 in the slice 10 as shown in FIG. 4B is slanted away from the outer boundary 12.

As shown in both FIGS. 4A and 4B the inner surface of the stack of sublayers 14 of the first outer wall part 2a has a ragged shape. The internal boundary 13 in the slice 10 shown in FIG. 4C has the same orientation as the internal boundary 13 shown in FIG. 4B. In the exemplary and non-limiting embodiment shown in FIG. 4C the stack of sublayers 14 of the first outer wall part 2a and the main layer 4 of the second outer wall part 2b only partially touch each other. Therefore, voids 24 are present between the bottom two sublayers of the stack of sublayers 14 of the first outer wall part 2a and the main layer 4 of the second outer wall part 2b. As can be seen from FIG. 4C, even between the top sublayer of the stack of sublayers 14 and the main layer 4 a void 24 can be present. The person skilled in the art will appreciate that no voids are present between the respective stacks of sublayers 14 and the respective main layers 4 shown in FIGS. 4A and 4B. The person skilled in the art will appreciate that these voids can be obviated for example by using pressure-controlled printing of the main layer 4 of the second outer wall part 2b.

Figure 5:
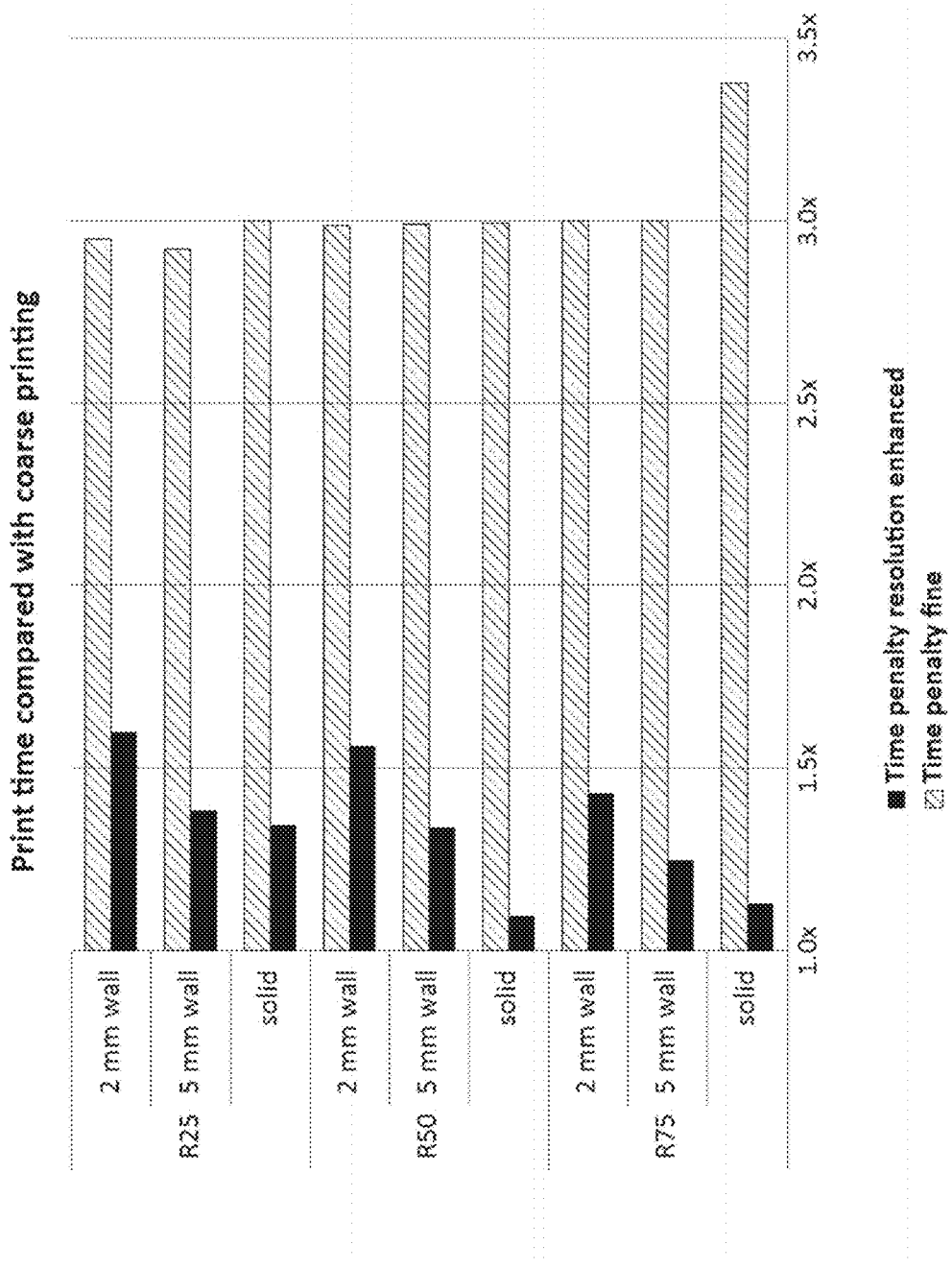
FIG. 5 shows results of a comparative study for printing different hemispheres having different dimensions and constructional properties, wherein the different hemispheres are printed using the method according to the present invention, a method known in the art for printing with a coarse, i.e. low, resolution, and a method known in the art for printing with a fine or high resolution. Taking the total printing time using the method with the coarse or low resolution as a reference, the time penalties for using the method with the fine or high resolution and the method according to the present invention are shown.

FIG. 5 shows results of a comparative study for printing different hemispheres having different dimensions and constructional properties, wherein the different hemispheres are printed using the method according to the present invention, a method known in the art for printing with a coarse or low resolution, and a method known in the art for printing with a fine or high resolution. Taking the total printing time using the method with the coarse or low resolution as a reference, the time penalties for using the method with the fine or high resolution and the method according to the present invention are shown.

The person skilled in the art will appreciate that any 3D object could have been chosen for this comparative study and that a hemisphere is just a non-limiting example for a 3D object.

In accordance with the method known in the art with the coarse or low resolution the tracks of extruded feedstock material have a so-called coarse track height. In accordance with the method known in the art with the fine or high resolution the tracks of extruded feedstock material have a so-called fine track height. For the comparative study of which the results with respect to total printing time of the different hemispheres, the coarse track height is chosen to be three times higher than the fine track height. The person skilled in the art will appreciate that the choice for a coarse track height that is three times higher than the fine track height is arbitrary and that any other suitable ratio can be used. In accordance with the method of the present invention the first high-resolution outer wall part 2a is filled with tracks of extruded feedstock material having a track height that is equal to the fine track height, and the second low-resolution outer wall part 2b is filled with tracks of extruded feedstock material having a track height that is equal to the coarse track height. In the event that the outer wall of the hemisphere is not completely divisible in said first high-resolution outer wall part and said second low-resolution outer wall part, the respective region of the outer wall of the hemisphere is provided with tracks of feedstock material having a track height that is equal to the fine track height. The inner parts of the hemispheres printed with the method according to the present invention are also provided with tracks of feedstock material having a track height that is equal to the coarse track height.

Furthermore, in the comparative study the printing times for hemispheres having a radius of 25 mm, 50 mm, and 75 mm using the abovementioned methods are compared. In addition, each hemisphere was sliced with three different settings for the wall thickness, i.e. wall thicknesses of 2 mm, 5 mm, and solid structure were used.

Based on the above, the person skilled in the art will appreciate that in total 27 different hemispheres have been printed. By taking the total printing times using the method with the coarse or low resolution as a reference, the time penalties for using the method with the fine or high resolution and the method according to the present invention can be calculated.

From FIG. 5 it can clearly be seen that when using the method with the fine or high resolution in accordance with which the track height of the tracks of extruded feedstock material is three times lower than the track height of the tracks of feedstock material used in the method with the coarse or low resolution, the total printing time of all hemispheres increases as expected roughly by a factor of three. When using the method according to the present invention, the outer surface smoothness is equal to a smoothness produced with the method with the fine or high resolution. However, the total printing time of the different hemispheres only increases with a factor between 1.1 and 1.6. The observed spread for the factor is mostly caused by the thickness of the outer wall. The person skilled in the art will appreciate that by using the method according to the present invention, the additional printing time of a 3D object related to printing an outer wall having an outer surface with an enhanced smoothness can be reduced. Consequently, the total printing time of the 3D object having an outer surface with an enhanced smoothness can be reduced.

Figure 6A:
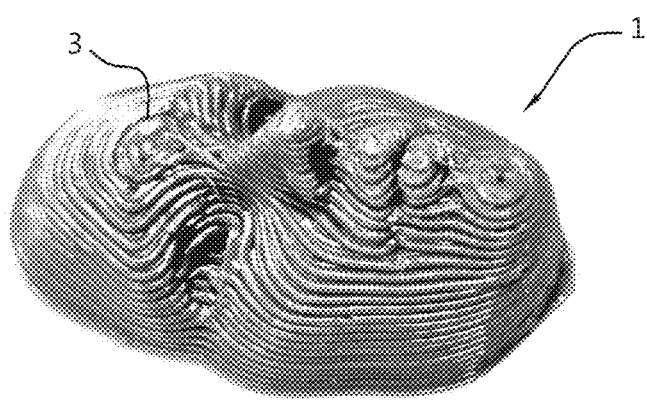
FIG. 6A shows a first version of another exemplary, non-limiting 3D printed object obtained with a method known in the art for printing with a coarse or low resolution.
Figure 6B:
FIG. 6B shows a second version of the exemplary, non-limiting 3D printed object shown in FIG. 6A obtained with the method according to the present invention.

FIG. 6A shows a first version of another exemplary, non-limiting 3D printed object 1 obtained with a method known in the art for printing with a coarse or low resolution. FIG. 6B shows a second version of the exemplary, non-limiting 3D printed object 1 shown in FIG. 6A obtained with the method according to the present invention. By comparing FIGS. 6A and 6B, it can clearly be seen that the second version of the 3D printed object 1 has an outer surface 3 with an enhanced smoothness as compared to the smoothness of the outer surface 3 of the first version of the 3D printed object 1. Moreover, based on the results of the comparative study shown in FIG. 5, the person skilled in the art will appreciate that the second version of the 3D printed object 1 shown in FIG. 6B can be printed with a limited time penalty. Based on the results of the comparative study described above, the total time required for printing the second version of the 3D printed object 1 shown in FIG. 6B will approximately be 1.1-1.6 times longer than the total time required for printing the first version of the 3D printed object 1 shown in FIG. 6A. Hence, the person skilled in the art will appreciate the abovementioned advantages of the method according to the present invention.

Figure 7:
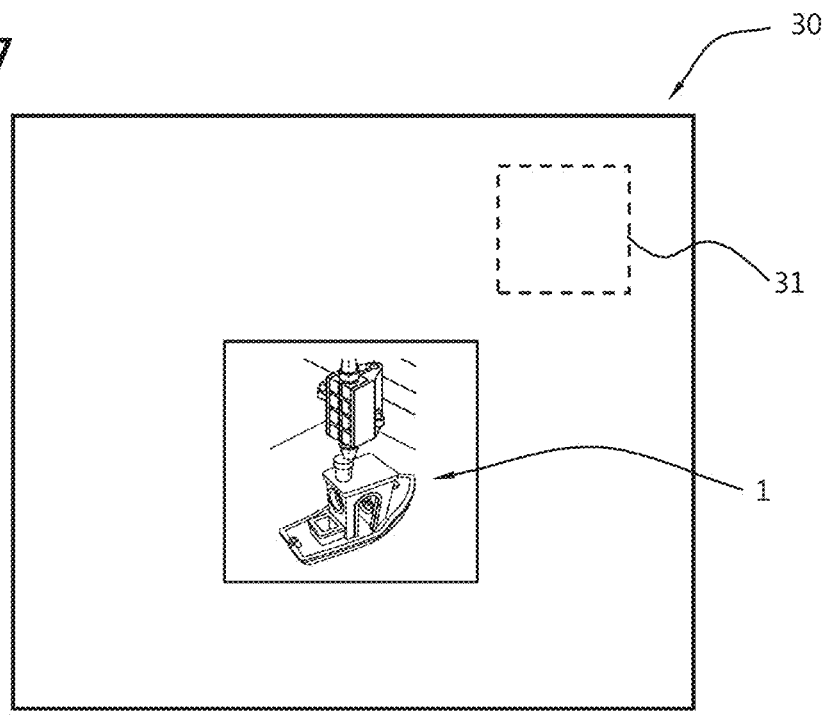
FIG. 7 shows a schematic representation of a 3D printing system according to the present invention, the 3D printing system comprising a processing unit that is adapted to print yet another exemplary, non-limiting embodiment of a 3D object using the method according to the present invention.

FIG. 7 shows a schematic representation of a 3D printing system 30 according to the present invention. The 3D printing system 30 comprising a processing unit 31 that is adapted to print yet another exemplary, non-limiting embodiment of a 3D object 1 using the method according to the present invention.

The person skilled in the art will appreciate that the processing unit 31 of the 3D printing system 30 according to the invention is operatively connected with all relevant parts of the 3D printing system 30 that are required to print the 3D object 1 using an extrusion-based additive manufacturing process. The 3D printing system 30 according to the invention is thus adapted to provide the 3D object 1 with an outer surface that has an enhanced smoothness while allowing the additional printing time related to printing the outer surface with the enhanced smoothness to be reduced.

The present invention can be summarized as relating to a method for reducing an additional printing time of a 3D object 1 related to printing of an outer wall 2 of the 3D object, the outer wall having an outer surface 3 with an enhanced smoothness. The outer wall is arranged to envelope an inner part 8 of the 3D object. The outer wall comprises at least one region comprising a first outer wall part 2a and a second outer wall part 2b. The first outer wall part forms the outer surface with the enhanced smoothness. The second outer wall part is arranged between the first outer wall part and the inner part and provides a low-resolution part of the outer wall having a less smooth outer surface than the first outer wall part. Hence, the additional printing time related to printing the outer wall having an outer surface with an enhanced smoothness can be reduced. The invention also relates to a 3D printing system 30 adapted to perform the method according to the invention and to a 3D printed object having the abovementioned outer wall.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

| REFERENCE NUMERALS | |
|---|---|
| 1 | 3D (printed) object |
| 2 | Outer wall of the 3D (printed) object |
| 2a | First outer wall part |
| 2b | Second outer wall part |
| 3 | Outer surface of the outer wall |
| 4 | Main layer |
| 5 | Sublayer |
| 6 | Track of a first type of tracks of extruded feedstock material |
| 7 | Track of a second type of tracks of extruded feedstock material |
| 8 | Inner part |
| 9 | 3D model |
| 10 | Slice of the number of slices of the 3D model |
| 11 | Predetermined slice height |
| 12 | Outer boundary |
| 13 | Internal boundary |
| 14 | Stack of sublayers |
| 15 | Total height of the stack of sublayers |
| 16 | Predetermined main layer height |
| 17 | Predetermined sublayer height |
| 18 | Plurality of sublayers |
| 19 | Distance between internal boundary and outer boundary |
| 20 | Track width of a track of the first type of tracks |
| 21 | Infill structure |
| 22 | Predetermined first track height |
| 23 | Predetermined second track height |
| 24 | Voids |

-continued

| REFERENCE NUMERALS | |
|---|---|
| 30 | 3D printing system |
| 31 | Processing unit |
| 200 | Flow diagram |
| 201 | First step in flow diagram |
| 202 | Second step in flow diagram |
| 203 | Third step in flow diagram |
| 204 | Fourth step in flow diagram |
| 205 | Fifth step in flow diagram |
| 206 | First decision step in flow diagram |
| 207 | Sixth step in flow diagram |
| 208 | Second decision step in flow diagram |
| 209 | Seventh step in flow diagram |
| 210 | Eighth step in flow diagram |
| 211 | Third decision step in flow diagram |
| 212 | Ninth step in flow diagram |
| 213 | Fourth decision step in flow diagram |
| 214 | Final step in flow diagram |

What is claimed is:

1. A method for reducing an additional printing time of a 3D object related to printing of an outer wall of the 3D object, the outer wall having an outer surface with an enhanced smoothness, the 3D object being fabricated using an extrusion-based additive manufacturing process by stacking main layers and sublayers comprising tracks of extruded feedstock material, the 3D object comprising an inner part, the outer wall being arranged to envelope the inner part, the method comprising:
 obtaining a 3D model of the 3D object;
 determining a number of slices by slicing the 3D model using a predetermined slice height;
 for at least one slice of the number of slices:
  determining an outer boundary of the 3D model;
  determining whether or not an internal boundary is definable in the outer wall to divide the outer wall in a first outer wall part and a second outer wall part, wherein the first outer wall part is arranged to extend between the outer boundary and the internal boundary and configured to be provided with a stack of sublayers that has a total height that is equal to the predetermined slice height to form the outer surface with the enhanced smoothness, and the second outer wall part is arranged to extend between the internal boundary and the inner part and configured to be provided with a main layer that has a predetermined main layer height that is equal to the predetermined slice height, wherein
  in response to determining that the predetermined slice height of a respective slice of the number of slices is at least as high as the predetermined main layer height, thereby establishing that the internal boundary in the outer wall is definable:
   positioning the internal boundary at a distance from the outer boundary at which a minimal number of tracks of a first type of tracks of extruded feedstock material for at least one sublayer of the stack of sublayers equals one,
   filling said at least one sublayer in the first outer wall part with said one track of the first type of tracks having a predetermined first track height that is equal to a predetermined sublayer height, which is a fraction of the predetermined slice height, and a track width having a minimum value that is equal to 50% of a nominal track width of tracks of the first type of tracks and a maximum value that is equal to 200% of the nominal track width of tracks of the first type of tracks, and
   filling the second outer wall part with the main layer; or
  in response to determining that the predetermined slice height of a respective slice of the number of slices is smaller than the predetermined main layer height, thereby establishing that the internal boundary in the outer wall is not definable:
   filling the outer wall of the respective slice with a plurality of sublayers, wherein each sublayer of the plurality of sublayers has a predetermined sublayer height that is a fraction of the predetermined slice height.

2. The method according to claim 1, wherein, provided that the internal boundary in the outer wall is definable, filling of a respective sublayer of the stack of sublayers is omitted if for the respective sublayer the distance from the outer boundary to the internal boundary is smaller than the minimum value of the track width of a track of the first type of tracks.

3. The method according to claim 2, wherein, provided that the internal boundary in the outer wall is definable, a respective sublayer of the stack of sublayers is filled with at least two tracks of the first type of tracks if for the respective sublayer the distance from the outer boundary to the internal boundary is larger than the maximum value of the track width of a track of the first type of tracks, wherein a total width of the at least two tracks is equal to said distance.

4. The method according to claim 3, wherein filling the outer wall of the respective slice with a plurality of sublayers further comprises:
 filling at least one sublayer of the plurality of sublayers with a minimal number of tracks of the first type of tracks of extruded feedstock material,
 wherein the minimal number of said tracks is one of:
  equal to zero if the outer wall of said at least one sublayer has a width that is smaller than said minimum value of the track width of a track of the first type of tracks, thereby preventing said at least one sublayer to be filled;
  equal to one if the width of the outer wall of said at least one sublayer has a value ranging from said minimum value to said maximum value of the track width of a track of the first type of tracks; and
  equal to at least two if the width of the outer wall has a value that is larger than said maximum value of the track width of a track of the first type of tracks, wherein said at least two tracks have a total width that is equal to the width of the outer wall, and
 wherein filling the second outer wall part with a main layer that has a predetermined main layer height that is equal to the predetermined slice height comprises:
  providing a track of a second type of tracks of extruded feedstock material, wherein the track of the second type of tracks has a predetermined second track height that is equal to the predetermined main layer height.

5. The method according to claim 4, wherein the inner part is provided with an infill structure that comprises a mesh of main layers, the main layers of said mesh comprising tracks of the second type of tracks of extruded feedstock material, and wherein the predetermined slice height is dependent on a desired printing time of the 3D object.

6. The method according to claim 5, wherein the predetermined slice height is dependent on a desired enhancement of the smoothness of the outer surface of the 3D object, and wherein the stack of sublayers of the first outer wall part is arranged to be in contact at the internal boundary with a main layer of the second outer wall part.

7. A 3D printing system for fabricating a 3D object using an extrusion-based additive manufacturing process, the system comprising a processing unit that is adapted to perform the method according to claim 6.

8. The method according to claim 1, wherein, provided that the internal boundary in the outer wall is definable, a respective sublayer of the stack of sublayers is filled with at least two tracks of the first type of tracks if for the respective sublayer the distance from the outer boundary to the internal boundary is larger than the maximum value of the track width of a track of the first type of tracks, wherein a total width of the at least two tracks is equal to said distance.

9. The method according to claim 1, wherein, provided that the internal boundary in the outer wall is definable, the distance from the outer boundary to the internal boundary has a minimum value that is equal to 50% of the nominal track width of tracks of the first type of tracks and a maximum value that is equal to 200% of the nominal track width of tracks of the first type of tracks, thereby allowing each sublayer of the stack of sublayers to be filled with one track of the first type of tracks.

10. The method according to claim 9, wherein filling the outer wall of the respective slice with a plurality of sublayers further comprises:
   filling at least one sublayer of the plurality of sublayers with a minimal number of tracks of the first type of tracks of extruded feedstock material,
   wherein the minimal number of said tracks is one of:
      equal to zero if the outer wall of said at least one sublayer has a width that is smaller than said minimum value of the track width of a track of the first type of tracks, thereby preventing said at least one sublayer to be filled;
      equal to one if the width of the outer wall of said at least one sublayer has a value ranging from said minimum value to said maximum value of the track width of a track of the first type of tracks; and
      equal to at least two if the width of the outer wall has a value that is larger than said maximum value of the track width of a track of the first type of tracks, wherein said at least two tracks have a total width that is equal to the width of the outer wall, and
   wherein filling the second outer wall part with a main layer that has a predetermined main layer height that is equal to the predetermined slice height comprises:
      providing a track of a second type of tracks of extruded feedstock material, wherein the track of the second type of tracks has a predetermined second track height that is equal to the predetermined main layer height.

11. The method according to claim 10, wherein the inner part is provided with an infill structure that comprises a mesh of main layers, the main layers of said mesh comprising tracks of the second type of tracks of extruded feedstock material, and wherein the predetermined slice height is dependent on a desired printing time of the 3D object.

12. The method according to claim 11, wherein the predetermined slice height is dependent on a desired enhancement of the smoothness of the outer surface of the 3D object, and wherein the stack of sublayers of the first outer wall part is arranged to be in contact at the internal boundary with a main layer of the second outer wall part.

13. A 3D printing system for fabricating a 3D object using an extrusion-based additive manufacturing process, the system comprising a processing unit that is adapted to perform the method according to claim 12.

14. The method according to claim 1, wherein filling the outer wall of the respective slice with a plurality of sublayers further comprises:
   filling at least one sublayer of the plurality of sublayers with a minimal number of tracks of the first type of tracks of extruded feedstock material,
   wherein the minimal number of said tracks is one of:
      equal to zero if the outer wall of said at least one sublayer has a width that is smaller than said minimum value of the track width of a track of the first type of tracks, thereby preventing said at least one sublayer to be filled;
      equal to one if the width of the outer wall of said at least one sublayer has a value ranging from said minimum value to said maximum value of the track width of a track of the first type of tracks; and
      equal to at least two if the width of the outer wall has a value that is larger than said maximum value of the track width of a track of the first type of tracks, wherein said at least two tracks have a total width that is equal to the width of the outer wall.

15. The method according to claim 1, wherein filling the second outer wall part with a main layer that has a predetermined main layer height that is equal to the predetermined slice height comprises:
   providing a track of a second type of tracks of extruded feedstock material, wherein the track of the second type of tracks has a predetermined second track height that is equal to the predetermined main layer height.

16. The method according to claim 15, wherein the inner part is provided with an infill structure that comprises a mesh of main layers, the main layers of said mesh comprising tracks of the second type of tracks of extruded feedstock material.

17. The method according to claim 1, wherein the predetermined slice height is dependent on a desired printing time of the 3D object.

18. The method according to claim 1, wherein the predetermined slice height is dependent on a desired enhancement of the smoothness of the outer surface of the 3D object.

19. The method according to claim 1, wherein the stack of sublayers of the first outer wall part is arranged to be in contact at the internal boundary with a main layer of the second outer wall part.

20. A 3D printing system for fabricating a 3D object using an extrusion-based additive manufacturing process, the system comprising a processing unit that is adapted to perform the method according to claim 1.

* * * * *